(12) United States Patent
Spamer

(10) Patent No.: US 7,651,143 B2
(45) Date of Patent: Jan. 26, 2010

(54) VEHICLE HEADLINER AND METHOD OF MANUFACTURE

(75) Inventor: Carl D. Spamer, Brighton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 180 days.

(21) Appl. No.: 11/871,055

(22) Filed: Oct. 11, 2007

(65) Prior Publication Data

US 2009/0096254 A1    Apr. 16, 2009

(51) Int. Cl.
*B60J 9/00* (2006.01)

(52) U.S. Cl. .................. 296/1.02; 296/214; 280/730.2

(58) Field of Classification Search ............ 296/187.05, 296/187.06, 1.02, 214; 280/730.2, 728.2
See application file for complete search history.

(56) References Cited

U.S. PATENT DOCUMENTS

| | | | |
|---|---|---|---|
| 6,102,435 | A | 8/2000 | Wallner et al. |
| 6,210,614 | B1 | 4/2001 | Gardner, Jr. et al. |
| 6,402,189 | B1 | 6/2002 | Gray et al. |
| 6,409,210 | B1 | 6/2002 | Emerling |
| 6,423,933 | B2 | 7/2002 | Nicholas et al. |
| 6,539,612 | B2 | 4/2003 | Brown et al. |
| 6,655,711 | B1 | 12/2003 | Labrie et al. |
| 6,657,158 | B1 | 12/2003 | Skelly et al. |
| 6,709,007 | B2 | 3/2004 | Gray et al. |
| 6,753,057 | B1 | 6/2004 | Gardner, Jr. |
| 6,976,701 | B2 | 12/2005 | Gray et al. |
| 7,100,939 | B2 * | 9/2006 | Blake et al. ............. 280/728.2 |
| 7,100,941 | B2 | 9/2006 | Riha et al. |
| 2001/0040361 | A1 * | 11/2001 | Tajima et al. ............ 280/728.2 |
| 2002/0130494 | A1 * | 9/2002 | Blake et al. ............. 280/730.2 |
| 2003/0146609 | A1 * | 8/2003 | Mueller ................... 280/730.2 |
| 2005/0029780 | A1 * | 2/2005 | Tanase .................... 280/730.2 |
| 2005/0046160 | A1 * | 3/2005 | Totani et al. ............ 280/730.2 |
| 2005/0052001 | A1 * | 3/2005 | Totani et al. ............ 280/728.2 |
| 2005/0104344 | A1 * | 5/2005 | Kim ........................ 280/730.2 |
| 2005/0242627 | A1 * | 11/2005 | Heholt ....................... 296/214 |
| 2006/0170252 | A1 | 8/2006 | Eichler et al. |
| 2007/0040360 | A1 | 2/2007 | Riha et al. |
| 2007/0132212 | A1 * | 6/2007 | Davey et al. ............ 280/728.3 |
| 2007/0228702 | A1 * | 10/2007 | Ono et al. ................ 280/730.2 |
| 2009/0127834 | A1 * | 5/2009 | Hemingway ............. 280/728.2 |

* cited by examiner

*Primary Examiner*—Jason S Morrow
(74) *Attorney, Agent, or Firm*—Gifford, Krass, Sprinkle, Anderson & Citkowski, P.C.

(57) ABSTRACT

A headliner for preventing an assist grip located proximate a curtain side airbag (CSA) from detaching from a motor vehicle frame during deployment of the CSA is provided. The headliner can include a substrate layer with an assist grip aperture dimensioned such that an assist grip attachment end can extend through the substrate layer and attach to sheet metal located adjacent to a back side of the headliner. Proximate to the assist grip aperture is a weakened region within the substrate layer that affords for headliner to bend and/or tear around the assist grip during deployment of the CSA. In addition, a fabric layer attached to and extending across the substrate layer is provided wherein the fabric layer covers the weakened region within the substrate layer.

9 Claims, 3 Drawing Sheets

VEHICLE HEADLINER AND METHOD OF MANUFACTURE

FIELD OF THE INVENTION

This invention relates generally to a motor vehicle headliner.

BACKGROUND OF THE INVENTION

Most motor vehicles have a fabric covered board that covers the roof portion of the vehicle interior. This fabric covered board is known as a headliner and is usually made from a pressed material, much like cardboard. The headliner covers sheet metal material, wiring, and the like. As such, the headliner adds aesthetic value to the interior of a motor vehicle.

With the advent of curtain side airbags (CSA), headliners have been developed that conceal the CSA from view and afford for the proper deployment of the CSA during a collision. In some headliners, the board material, also known as the substrate, has a weakened region outlining where the curtain side airbag is stored, the weakened region allowing the curtain side airbag to burst through the headliner during deployment and properly protect occupants within the motor vehicle.

Most motor vehicles also have assist grips located in the interior above side windows. As the name implies, the assist grips are grip structures that can be grasped by an individual and assist them with entering or leaving the motor vehicle, shifting their weight, stabilizing their selves while the vehicle is turning, and the like. Assist grips typically penetrate through the headliner and attach to sheet metal material of the interior roof and located on a backside of the headliner. In some instances, the deployment of the curtain side airbag out from under the headliner can cause an assist grip to be detached from the sheet metal underneath. In this situation, the assist grip can become a flying object during an accident and possibly injure an occupant. Therefore, a headliner that affords for assist grips located proximate to the CSA to remain attached to the motor vehicle frame during deployment of the CSA would be desirable.

SUMMARY OF THE INVENTION

Disclosed is a headliner for preventing an assist grip located proximate a curtain side airbag (CSA) from detaching from a motor vehicle frame during deployment of the CSA. The headliner can include a substrate layer with an assist grip aperture dimensioned such that an assist grip attachment end can extend through the substrate layer and attach to sheet metal located adjacent to a back side of the headliner. Proximate to the assist grip aperture is a weakened region within the substrate layer that affords for headliner to bend and/or tear around the assist grip during deployment of the CSA. In addition, a fabric layer attached to and extending across the substrate layer is provided wherein the fabric layer covers the weakened region within the substrate layer. In some instances, the weakened region is a plurality of slits within the substrate layer, each of the slits extending in a generally outward direction from the assist grip aperture.

DETAILED DESCRIPTION OF THE PREFERRED EMBODIMENTS

The present invention is a headliner for preventing an assist grip located proximate a curtain side airbag (CSA) from detaching from a motor vehicle frame during deployment of the CSA. As such, the headliner described herein has utility for improving safety of a motor vehicle.

The headliner disclosed herein affords for assist grips to remain attached to the motor vehicle frame during deployment of the CSA that is located proximate to the assist grips. The CSA can be located below or above the assist grips. The headliner includes a substrate layer that has at least one assist grip aperture, the assist grip aperture affording for an attachment end of the assist grip to pass therethrough and attach to the motor vehicle frame. Proximate to the assist grip aperture is a weakened region that affords for the substrate to bend, tear and/or stretch, and thus be pulled over the assist grip when the CSA located nearby is deployed. In some instances, the weakened region is made from a plurality of slits that extend through the substrate and in a generally outward direction from the assist grip aperture.

Figure 1:
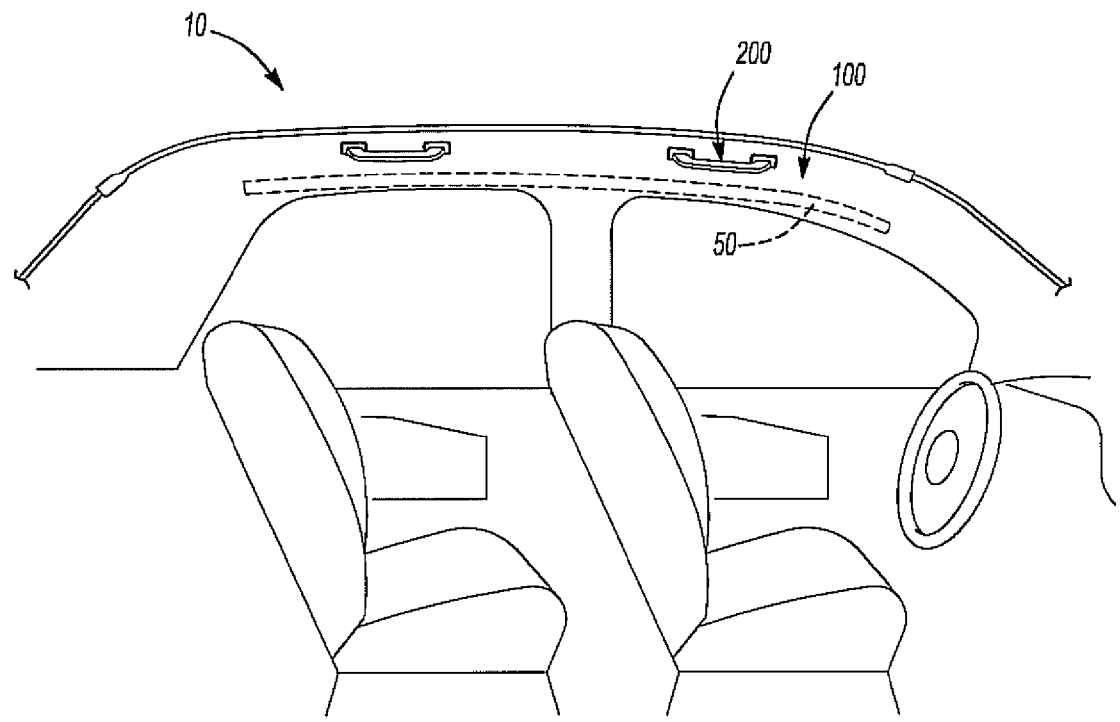
FIG. 1 is a perspective view of an interior of a motor vehicle wherein a headliner and assist grip are illustrated.

Referring now to FIG. 1, there is shown a perspective view of an interior of a motor vehicle with two assist grips 200 located above side windows. The assist grips 200 extend through a headliner 100 and attach to sheet metal (not shown). Located proximate to the assist grips 200 and underneath the headliner 100 is a CSA 50.

Figure 3:
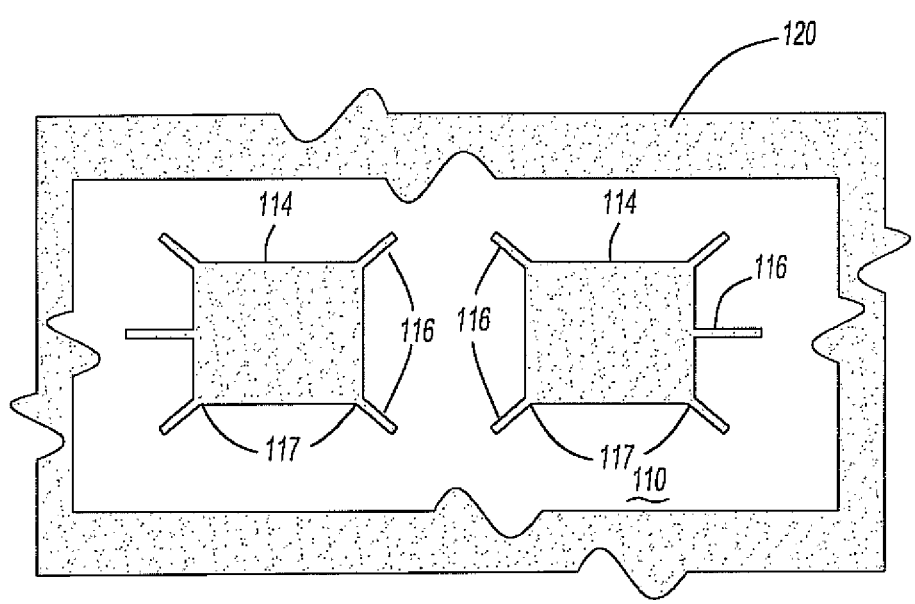
FIG. 3 is a top view of an embodiment of the present invention.
Figure 2:
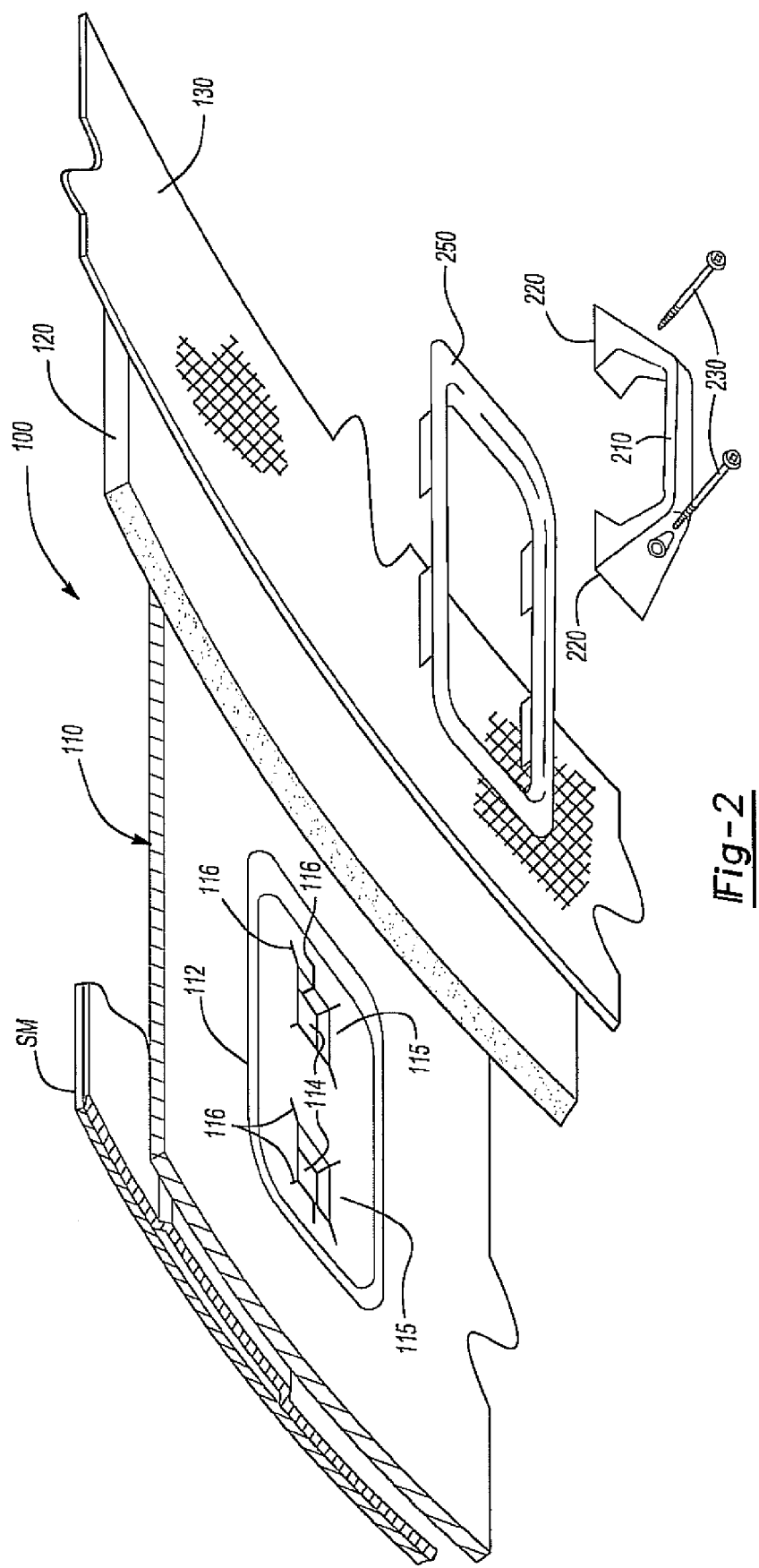
FIG. 2 is an exploded view of an embodiment of the present invention.

Turning now to FIG. 2, an exploded view of the region containing an assist grip 200 is shown. The headliner 100 includes a substrate layer 110, an optional piece of foam layer 120 and a fabric layer 130. The substrate layer 110 has an assist grip region 112. Within the assist grip region 112 can be a pair of assist grip apertures 114. In some instances, the assist grip apertures 114 are rectangular in shape, wherein rectangular in shape includes a square shape also. Proximate to the assist grip apertures 114 is a weakened region 115 that can include a plurality of slits 116. In some instances, the slits 116 extend in a generally outward direction from the assist grip apertures 114. If the assist grip aperture 114 is a rectangular shaped aperture, the assist grip aperture 114 can have four corner regions 117 with a slit 116 extending from each of the corner regions 117 as shown in FIG. 3. It is appreciated that other structures can afford for the weakened regions 115, illustratively including a plurality of apertures proximate to the assist grip region 112.

Adjacent to and extending across the substrate layer 110 is the fabric layer 130. The fabric layer 130 covers the weakened regions 115 such that they are not visible to an occupant of the motor vehicle once the assist grips 200 are installed and attached to the sheet metal SM. Optionally, the foam layer 120 can be located between the substrate layer 110 and the fabric layer 130. In addition, a piece of trim 250 can optionally be included around the assist grip region 112.

The assist grip 200 can include a handle portion 210 and an attachment end 220. In some instances, the assist grip 200 has two attachment ends 220. The assist grip ends 220 extend through the assist grip apertures 114 of the substrate layer 110 and the assist grip 200 can be attached to the sheet metal SM. In FIG. 2, the attachment is accomplished by a fastener 230 in the form of a screw, however any type of attachment mechanism can be used, illustratively including clips, adhesives, nuts and bolts, and the like.

It is appreciated that the assist grip apertures 114 extend through the substrate layer 110 as illustrated in FIG. 3 which shows a view from a back side of the substrate layer 110 with the optional foam layer 120 located adjacent to a front side of the substrate layer 110. In addition, the slits 116 can extend through the substrate layer 110 and may be continuous with the assist grip apertures 114. In this manner, weakened regions 115 proximate to the assist grip apertures 114 are afforded and provide a structurally weakened area around the apertures.

As illustrated in FIGS. 2 and 3, the optional foam layer 120 and the fabric layer 130 do not have an aperture for the attachment end 220 of the assist grip 200 to fit through. It is appreciated that the attachment end 220 can be attached to the sheet metal SM without apertures in the foam layer 120 and the fabric layer 130. In the alternative, the foam layer 120 and/or the fabric layer 130 can have an aperture, slit and the like that afford for assistance in attaching the attachment end 220 to the sheet metal SM. It is also appreciated that the attachment end 220 can be located on top of the fabric layer 130 as shown in FIG. 4 with only the fastener 230 extending through the assist grip aperture 114 and attaching to the sheet metal SM.

Figure 4:
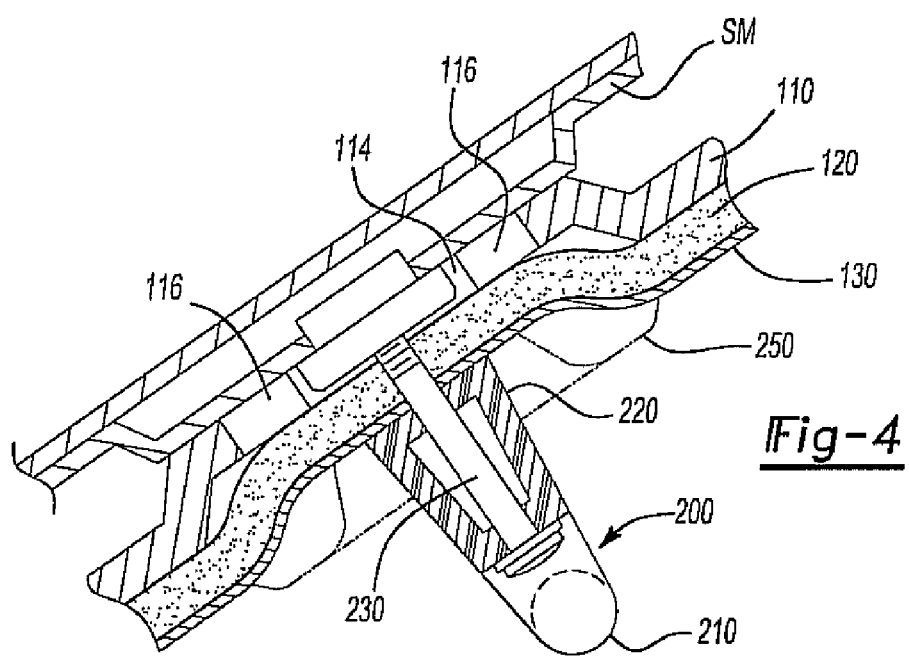
FIG. 4 is a cross-sectional side view of an embodiment of the present invention.
Figure 5:
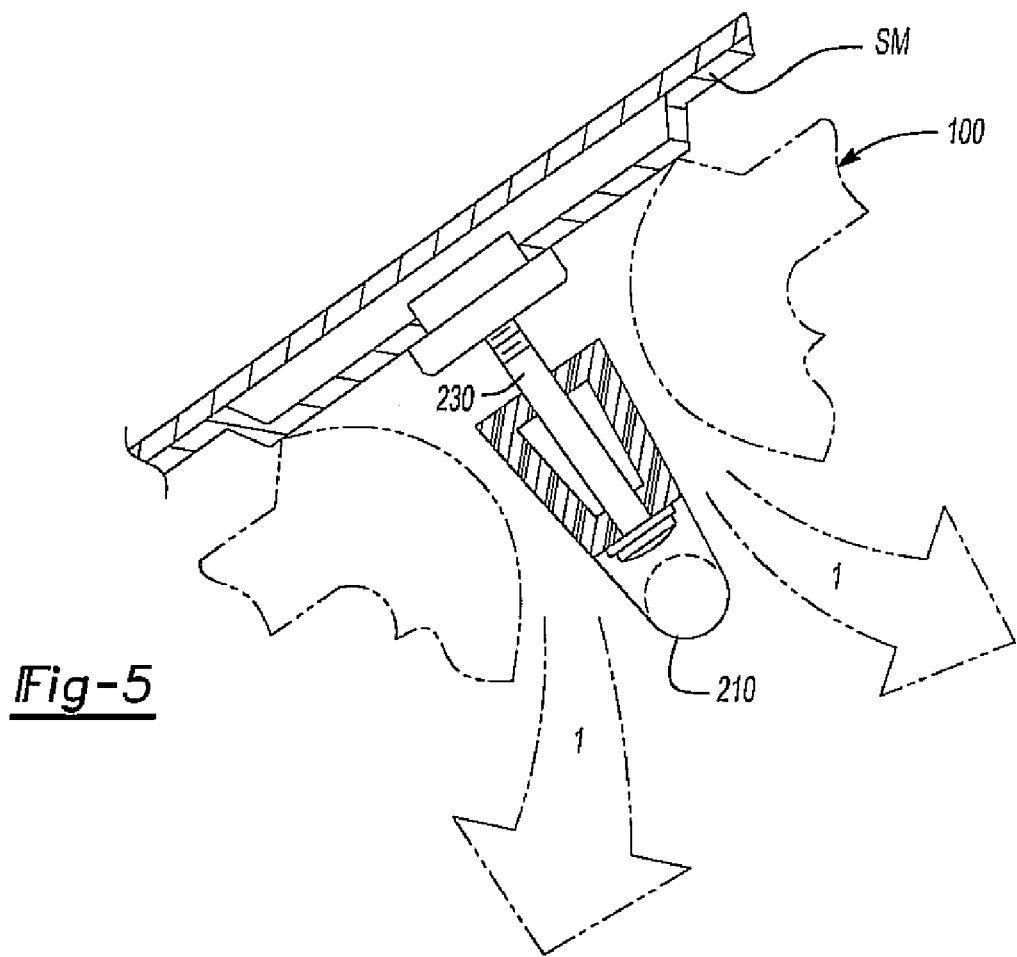
FIG. 5 is a cross-sectional side view of an embodiment illustrating deployment of a curtain side airbag.

Turning now to FIGS. 4 and 5, the operation of the headliner described above is illustrated. FIG. 4 shows a cross-sectional side view of the assist grip 200 attached to the sheet metal SM. The fastener 230 attaches the assist grip 200 to the sheet metal SM with the attachment end 220 extending through the fabric layer 130, the foam layer 120 and the assist grip aperture 114 of the substrate layer 110. As can be appreciated from FIGS. 3 and 4, the foam layer 120 and the fabric layer 130 conceal the slits 116 within the substrate layer 110 from the interior of the motor vehicle. Upon deployment of the curtain side airbag 50 located proximate to the assist grip 200, the headliner 100 is forced in a generally outward direction 1 from the sheet metal SM. The weakened regions 115 afford for the substrate layer 110 to bend, tear, stretch and the like such that the substrate layer 110 can be pulled past or over the assist grip 200 while the grip 200 remains attached to the sheet metal SM. In this manner, the assist grip 200 does not become a flying object during the deployment of the curtain side airbag 50.

It is appreciated that the substrate layer 110, foam layer 110, fabric layer 130 and assist grip 200 can be made from any material known to those skilled in the art, illustratively including plastics, cardboard, cloth, and the like.

In addition to the headliner 100 disclosed above, a method for attaching the assist grip 200 to the sheet metal SM is provided such that the grip 200 does not detach from the sheet metal SM during deployment of the CSA 50. The method includes providing a headliner 100 as disclosed above, with the headliner 100 attached to the interior roof of the motor vehicle. Once the headliner 100 has been installed, the assist grip 200 with the attachment ends 220 is inserted at least partially through the assist grip apertures 114 such that attachment to the sheet metal SM is afforded. Once the assist grip 200 is attached in this manner, deployment of the curtain side airbag 50 results in the headliner 100 including the substrate layer 110 bending, tearing and the like such that the substrate layer 110 is pulled over the assist grip 200 and the assist grip 200 remains attached to the sheet metal SM.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

I claim:

1. A headliner for enhancing an assist grip to remain attached to a motor vehicle frame during deployment of a curtain side airbag proximate said assist grip, said headliner comprising:

a substrate layer having an assist grip aperture with four corners dimensioned such that an assist grip attachment end can extend therethrough;

a weakened region within said substrate layer proximate said assist grip aperture, said weakened region having a plurality of slits and at least one of said plurality of slits extending from each of said four corners of said assist grip aperture in a generally outward direction; and a fabric layer attached to and extending across said substrate layer, said fabric layer covering said weakened region within said substrate layer.

2. The headliner of claim 1, wherein said weakened region within said substrate layer is proximate a curtain side airbag region.

3. The headliner of claim 1, further comprising a foam layer between said substrate layer and said fabric layer.

4. The headliner of claim 3, wherein said slit does not extend though said foam layer.

5. The headliner of claim 1, wherein said plurality of slits are formed using a water jet cutter.

6. The headliner of claim 1, further comprising a pair of assist grip apertures in said substrate layer dimensioned such that a pair of assist grip attachment ends can extend therethrough, each of said pair of assist grip apertures having four corners and a weakened region within said substrate layer proximate said assist grip aperture, said weakened region having a plurality of slits and at least one of said plurality of slits extending from each of said four corners of said assist grip aperture in a generally outward direction.

7. The headliner of claim 6, further comprising a trim attached to said fabric layer proximate said pair of assist grip apertures.

8. A headliner for enhancing an assist grip to remain attached to a motor vehicle frame during deployment of a curtain side airbag proximate said assist grip, said headliner comprising:

a substrate layer having a pair of assist grip apertures spaced apart from each other and dimensioned such that a pair of assist grip attachment ends can extend therethrough;

each of said pair of assist grip apertures having four corners and a weakened region within said substrate layer proximate said assist grip aperture, said weakened region having a plurality of slits and at least one of said plurality of slits extending from each of said four corners of said assist grip aperture in a generally outward direction; and a fabric layer attached to and extending across said substrate layer, said fabric layer covering said pair of weakened regions within said substrate layer.

9. The headliner of claim 8, further comprising a foam layer between said substrate layer and said fabric layer.

* * * * *

UNITED STATES PATENT AND TRADEMARK OFFICE
CERTIFICATE OF CORRECTION

| | |
|---|---|
| PATENT NO. | : 7,651,143 B2 |
| APPLICATION NO. | : 11/871055 |
| DATED | : January 26, 2010 |
| INVENTOR(S) | : Carl D. Spamer |

It is certified that error appears in the above-identified patent and that said Letters Patent is hereby corrected as shown below:

Column 4, line 31 replace "though" with --through--

Signed and Sealed this

Twenty-fourth Day of August, 2010

David J. Kappos
*Director of the United States Patent and Trademark Office*